US007224960B2

(12) United States Patent
Giacalone et al.

(10) Patent No.: US 7,224,960 B2
(45) Date of Patent: May 29, 2007

(54) SYSTEM AND METHOD FOR UPDATING WIRELESS APPLICATIONS

(75) Inventors: Joseph Giacalone, San Diego, CA (US); Timothy Thome, Spring Valley, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 11/179,207

(22) Filed: Jul. 12, 2005

(65) Prior Publication Data

US 2007/0015498 A1      Jan. 18, 2007

(51) Int. Cl.
*H04M 1/66* (2006.01)
(52) U.S. Cl. ............... 455/410; 455/435.2; 455/552.1
(58) Field of Classification Search ............ 455/435.2, 455/552.1, 410, 552
See application file for complete search history.

(56) References Cited

U.S. PATENT DOCUMENTS 6,625,451 B1 *  9/2003  La Medica et al. ......... 455/434
2005/0272469 A1 * 12/2005 Lee et al. .................... 455/557

FOREIGN PATENT DOCUMENTS

WO    WO 00/74410       12/2000
WO    WO 01/67674        9/2001

OTHER PUBLICATIONS

Anonymous: "Push-to-talk over Cellular Requirements, OMA-RD_PoC-v1_0-20040331-A" Internet Citation, [Online] (Mar. 31, 2004), XP002376928 at http://member.openmobilealliance.org.
International Search Report (ISR): PCT/ISA/220, 210 for International Application No. PCT/US2006/027044, ISR dated Nov. 16, 2006, 6 pages.

* cited by examiner

*Primary Examiner*—Joseph Feild
*Assistant Examiner*—S. Smith

(57) ABSTRACT

A system for updating a wireless application is provided. The system has a network service area that uses multiple networks to provide wireless coverage. An application server couples to one of the networks, and is used to communicate with local applications that operate on wireless devices within the network service area. These wireless devices also operate standard lower-level process that provide for basic connectivity and information transfer, with these lower-level process providing a network identification value. The local application monitors this network identification value, and when it changes, generates an alert that is transmitted to the application server. The alert may include information regarding the new network, therefore the application server is updated to know what network the wireless device is operating on.

17 Claims, 6 Drawing Sheets

SYSTEM AND METHOD FOR UPDATING WIRELESS APPLICATIONS

FIELD OF THE INVENTION

The present invention relates generally to the field of wireless communication devices, and, more particularly, to a wireless mobile unit communicating with an application server.

BACKGROUND OF THE INVENTION

Wireless communication devices are widely used, and have become an essential aspect of modern life. Wireless communication devices such as pagers, mobile phones, text pagers, PDA's (personal data assistants) are used for work, for personal activities, and as a way to keep in contact with family and friends. These wireless device are increasingly available in cars, boats, appliances, and entertainment equipment. As the number and type of these wireless devices increase, application developers continue to provide exciting and innovative applications to make the wireless devices easier to use, and to enhance their usefulness. Further, wireless service providers have invested heavily in infrastructure equipment to support higher data rates to wireless devices, and thereby are enabling a wide range of new and exciting applications.

In one more specific application, wireless mobile handsets have been evolving from primarily voice-communication devices to now support high speed data communication. This evolution has enable the typical wireless handset to now download and play audio and video files using multimedia applications, take and transmit digital photos or video, operate schedulers, address books, and other management applications, as well as a wide range of games and entertainment applications. Also, as wireless handsets further include position location systems, these handsets will enable a whole new class of position-location applications.

These wireless handsets most often access a wireless network according to well defined and well established standards. For example, wireless handsets may operate according to the well-defined CDMA, WCDMA, UMTS, CDMA2000, GSM, EDGE, PHS, AMPS, or other standard. More particularly, these standards have matured to allow for seamless movement within a network, as well as between networks, even when the service providers change. More particularly, the telephony functions operating between the handset and the network are consistently applied and used according to well defined processes. In this way, basic voice communication and basic data transmission may be reliably, robustly, and seamlessly provided to the users of wireless handsets.

Unfortunately, at the application level, there is far less consistency in operation, and far less guidance from the standards. Also, many applications are being advanced by developers who are generally unfamiliar with the complexities of the underlying telephony functions. Accordingly, the deployment of applications has been stymied by a lack of standardization, by inconsistent development and interoperability processes, and by a lack of telephony experience in application developers. This leads to applications that under perform or inconsistently operate. To force their applications into having at least some level of consistent operation, some developers have caused their applications to engage in unnecessarily extensive network communication. Since the application developers do not have an elegant process for interfacing with the telephony functions, the application developers find "work-arounds" and "fixes" that allow their applications to operate, but at the expense of high network traffic and wasted processing power at the handset. For example, many applications require that a home application server communicate with the mobile handsets operating the application. If the application server can not locate a particular mobile handset, then the application fails, leading to user dissatisfaction. In another possible, but undesirable solution, the application server could poll the HLR (Home Location Register) or other network resource. By a server-initiated poll, the server may be able to locate the current location of a particular mobile unit. Such a solution, however, generates significant and undesirable network traffic. Even with such a polling process, the server still loses contact with the mobile for a period of time during the polling process. In such a case, a mobile-initiated activity or request may be lost or ignored. Of course, it is fundamental to the wireless handset that it be allowed to move from one network to another network, and such mobility has been routine for years with the basic telephony functions. In this regard, users have an expectation that their applications, too, will seamlessly and reliably operate irrespective of movement across networks. However, since the application is generally unaware of its network configuration, the application will periodically reinitialize itself to force the handset to re-identify the current network. This reinitialization process uses valuable network bandwidth, as well as interferes with local handset operation.

SUMMARY OF THE INVENTION

The present invention provides a system for updating a wireless application. The system has a network service area that uses multiple networks to provide wireless coverage. An application server couples to one of the networks, and is used to communicate with local applications that operate on wireless devices within the network service area. These wireless devices also operate standard lower-level process that provide for basic connectivity and information transfer, with these lower-level process providing a network identification value. The local application monitors this network identification value, and when it changes, generates an alert that is transmitted to the application server. The alert may include information regarding the new network, therefore the application server is updated to know what network the wireless device is operating on.

In one particular example, the present invention provides a system for updating an application for a mobile handset. The system has a network service area that uses multiple networks to provide wireless coverage. An application server couples to one of the networks, and is used to communicate with local applications that operate on mobile handsets within the network service area. These mobile handsets also operate standard telephony processes that provide for basic voice and data communication, with these telephony process providing a telephony identification value. The local application monitors this telephony identification value, and when it changes, generates an alert that is transmitted to the application server. The alert may include information regarding the new network, therefore the application server is updated to know what network the mobile handset is operating on.

Advantageously, the system for updating a wireless application enables an application server to efficiently and effectively communicate with its associated wireless devices. In this way, the system provides for robust, reliable, and consistent operation of wireless applications, while avoiding excess network traffic or wasting processing power in the wireless device. These and other features of the present invention will become apparent from a reading of the following description, and may be realized by means of the instrumentalities and combinations particularly pointed out in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
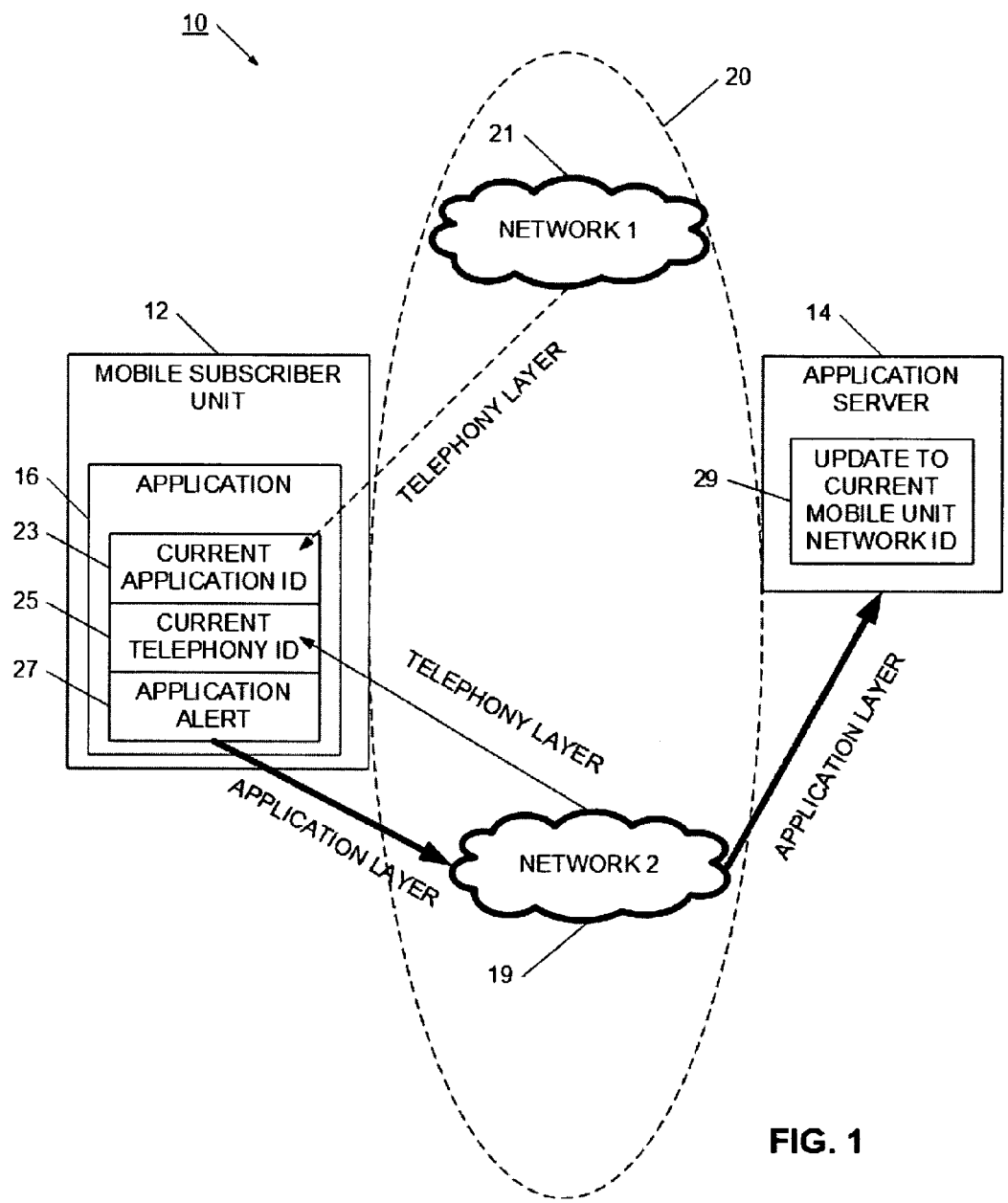
FIG. 1 is a block diagram of a system for updating a wireless application in accordance with the present invention.

Referring now to FIG. 1, a system for updating a wireless application is illustrated. Generally, an application has application server 14 which cooperates with local application 16 operating on mobile device 12. Together, application server 14 and local application 16 enable enhanced functionality of mobile device 12. For example, the application may enable a push-to-talk feature, which allows a pre-defined group to more effectively communicate within the group. In another example, the application may push desirable information to mobile device 12, dependent on the device's current location. More particularly, system 10 enables local application 16 to continually update application server 14 so that application server 14 knows on which network mobile device 12 is currently operating. In this way, application server 14 may efficiently control and communicate with each mobile device, while avoiding the extra network traffic and delays associated with reinitializing local application 16.

System 10 has network service area 20 which may be, for example, a wireless communication network. This wireless communication network may comply with one or more international standards, for example CDMA, WCDMA, CDMA 2000, GSM, PHS, amps, UMTS, or other existing or evolving communications standard. Although system 10 is described with reference to a wireless communication network, it will be appreciated that other types of wireless networks may be used. Generally, network service area 20 includes several overlapping networks, where each of these networks provides network coverage for a particular geographic area. For example, network service area 20 is illustrated having first network 21 and second network 19. It will be understood that network service area 20 may include several individual networks, which may be operated by the same or different service providers. Generally, network service area 20 includes a network infrastructure for interconnecting the various networks. This network infrastructure may include, for example, base stations, base station controllers, network backbone connections, and network servers. It will be appreciated that other components may be used to assist in interconnecting or operating the networks.

System 10 also includes mobile subscriber units, such as mobile subscriber unit 12. It will be appreciated that many mobile subscriber units may operate within the network service area 20. For ease of explanation, only one mobile subscriber unit 12 will be described in detail. Mobile subscriber unit 12 may be for example, a mobile wireless handset, a personal data assistant, or a portable computer. In another example, mobile subscriber unit 12 is a modem access device built into another device, such as a car, truck, or other vehicle. Mobile subscriber unit 12 operates according to the same communication standard as operating within network 21 and network 19. As mobile subscriber unit 12 moves within network service area 20, mobile subscriber unit 12 connects first through one network, and then as it moves, will connect through another network. In some cases, the networks are operated by the same service provider, and in other cases the networks maybe operated by different service providers. Some mobile subscriber units are constructed to operate in more than one mode or according to more than one communication standard. In this way, mobile subscriber unit 12 may operate in one mode or standard when connected through one network, and then may operate on a different mode or communication standard when moving into another network. As illustrated in FIG. 1, mobile subscriber unit 12 is initialized and connects through first network 21, and then moves to a place where it connects through second network 19.

Mobile subscriber unit 12 may operate as a traditional voice mobile handset. In this way, the mobile subscriber unit 12 operates using traditional telephony procedures consistent with the relevant communication standard. For example, if network 21 is a CDMA network, then the voice communication between mobile subscriber unit 12 and network 21 is accomplished according to the detailed instructions provided in the CDMA standard. In a similar manner, if network 21 is a GSM network, then the voice communication between mobile subscriber unit 12 and network 21 is accomplished according to the detailed instructions provided in the GSM standard. Over the years, the various wireless communication standards have evolved to provide a fully operational and robust communication process at the telephony level. Mobile subscriber unit 12 may also operate one or more applications. These applications may be, for example, a push to talk application that facilitates easy communication among a predefined group, position location applications, or information broadcast applications. In another example, the application may be a game, a mapping application, audio or video application, or sales support application. It will be appreciated that other applications may be used, and that new applications are continually being developed.

Often, the application has local application 16 operating on the mobile subscriber unit 12, and which cooperates with application server 14. The application may require that local application 16 communicate with application server 14 to transmit information to or receive information from mobile subscriber unit 12. For example, if local application 16 is a push to talk application, when local application 16 desires to send a voice message to others in a predefined group, local application 16 sends a request to application server 14. In this case, application server 14 is a push to talk server, which first locates the current network of other members in the group, and then coordinates sending the appropriate voice or data information to other members in the group. In another example, local application 16 may be a news broadcast application. In this example, application server 14 is a news server, which sends selected news items to local application 16. Local application 16 then presents the received news information to the user of mobile subscriber unit 12. In order to facilitate efficient operation of the application, application server 14 desirably is aware of the current location for all the mobile subscriber units, such as unit 12. More particularly, it is desirable that application server 14 be aware through which network each mobile subscriber unit is currently operating.

System 10 is able to advantageously update application server 14 with current information regarding which network mobile subscriber unit 12 is currently using. In this way, application server 14 is enabled to efficiently communicate with and control the application and mobile subscriber unit 12. When mobile subscriber unit 12 initializes, or when local application 16 is first activated, a network identification is extracted from the telephony layer communications. For example, wireless communication standards may require that the network broadcast certain network identification information during initialization or periodically during operation. The network identification information is well-defined in most wireless communication standards. For example, CDMA defines a SID, NID, Zone ID, MCC, and IMSI_11_12 value for identifying the current network. The generation and use of these values is fully set out in the relevant standard documents, and therefore will not be discussed in detail. It will be appreciated that other standards have similar values and parameter for identifying the current network. These values are automatically received by mobile subscriber 12 unit upon initialization and stored as telephony ID 25. Current telephony ID 25 is updated periodically as mobile unit 12 moves from one network to another network. Local application 16 extracts network identification information from the telephony layer, and stores the network identification value as current application ID 23. Then, as local application 16 operates, local application 16 continually monitors current telephony ID 25 extracted from the telephony layer communications. In one example, current telephony ID 25 is stored within local application 16. As long as mobile subscriber unit 12 operates within a single network, such as network 21, current application ID 23 and current telephony ID 25 are the same. However, when mobile subscriber unit 12 moves to operate within second network 19, then the telephony layer automatically updates mobile subscriber unit 12 to indicate mobile subscriber unit 12 is operating within network 19. Local application 16, which is monitoring current telephony ID 23, now has current application ID 23 showing network 21 identification information, while current telephony ID 25 shows the identification information for network 19. Since the network IDs are different, local application 16 is aware that mobile subscriber unit 12 has moved to a new network. In this way, local application 16 may generate application alert 27. Application alert 27 may then be communicated through network 19 to application server 14. Application server 14 is then able to update its location information 29 to indicate that mobile subscriber unit 12 is now operating within network 19.

Application alert 27 may automatically generate responsive to detecting that the current network has changed. In another example, application alert 27 may apply local rules within application 16 for determining an appropriate application alert. For example, local application 16 may have rules that provide that application alert 27 may be generated when it detects a network operated by a different service provider. In another example, local application 16 may have a local list of approved networks, and only generate application alert 27 when the current network is not listed. It will be appreciated that local application 16 may apply various rules as to when application alert 27 is generated. It will also be appreciated that application alert 27 may include various information. For example, application alert 27 may send current telephony ID 25 information, warnings and other information relevant to mobile unit's 12 current condition.

In another example, application server 14 may keep a historical record of locations for mobile unit 12. Location information 29 may include past locations for mobile unit 12. In this way, if mobile unit 12 is in a border area between two networks, and its current telephony ID 25 is continually toggling between the two networks, application server 14 may attempt to communicate with mobile unit 12 in both networks. More particularly, if the application server 14 detects that the location of mobile unit 12 is toggling between two networks, and a communication to mobile unit 12 fails, then the application server 14 could immediately attempt a re-communication using the other network. This process may enable efficient and robust communication between mobile unit 12 and application server 14, even when mobile unit 12 is traversing the border between networks.

Figure 2:
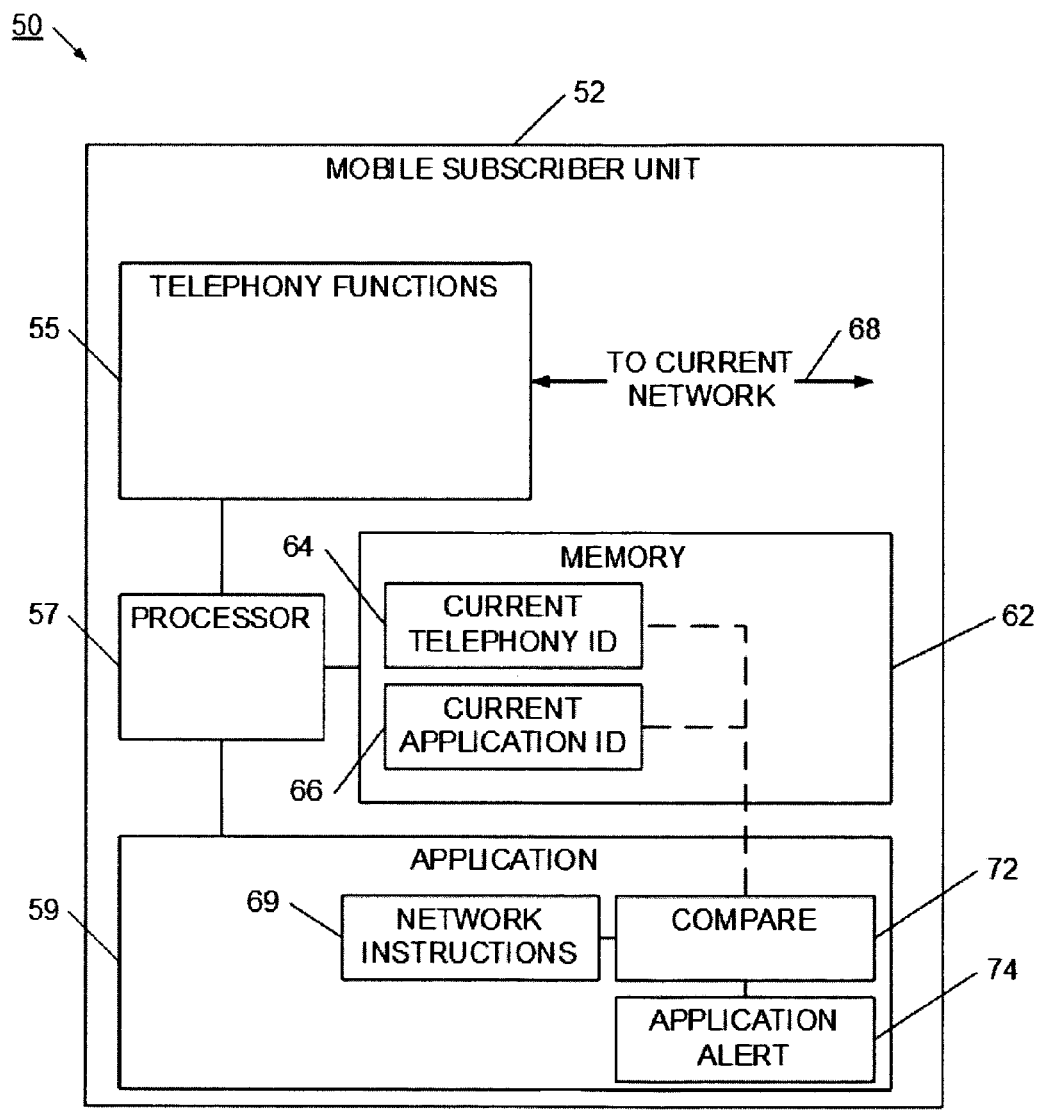
FIG. 2 is a block diagram of a mobile subscriber unit in accordance with the present invention.

Referring now to FIG. 2, mobile subscriber unit system 50 is illustrated. System 50 includes mobile subscriber unit 52. Mobile subscriber unit 52 is configured to operate within a wireless communication system. The wireless communication system includes a network service area having multiple networks. Mobile subscriber unit 52 is also configured to operate according to wireless communication standards employed in corresponding networks. In this way, the voice communication between mobile subscriber unit 52 and its corresponding network connections are well defined. In operation, mobile subscriber unit 52 connects to a current network through communication line 68. Communication line 68 typically includes modulator's, demodulator's, amplifiers, antennas, and other components and devices. Since the construction of mobile wireless units is well-known, the construction of a mobile subscriber unit will not be described in detail.

Mobile subscriber unit 52 may be in the form of a mobile wireless handset, a personal data assistant, a modem access module, or a portable computer, for example. It will be appreciated that other types of mobile subscriber units may be used. Generally, mobile subscriber unit 52 conforms to a communication standard for providing telephony functions 55. Telephony functions 55, which may include voice and data functions, are well defined and understood, therefore will not be described in detail. Processor 57 is used to perform call processing, some of the telephony functions, as well as operate other processes and peripherals to subscriber unit 52. It will be understood that processor 57 may be a single processor, or may be multiple processors or components. Processor 57 has memory 62 for holding data and operational information. For example, mobile subscriber unit 52 may be constructed to operate local application 59. In one example, local application 59 may be a push to talk function. In another example, local application 59 may be a position location, broadcast, video, or audio application. Local application 59 operates at least in part on processor 57.

Preferably, processor 57 has access to telephony functions 55, application 59, as well as memory 62. In this way, as telephony functions 55 are updated or performed, telephony functions 55 may be used to direct application 59 functions. For example, as mobile subscriber unit 52 moves from one network to another network, telephony functions 55 act to automatically update certain network identification values. For example, if mobile subscriber unit 52 complies with a CDMA standard, then the updated values may include a SID value, a NID value, a Zone ID value, an MCC value, or an IMSI_11_12 value. If subscriber unit 52 complies with another standard, such as the GSM standard, other telephony identification functions or values will likewise be updated. Local application 59 is thereby enabled to extract the current telephony identification information from the telephony functions 55, and store that information within memory 62.

When mobile subscriber unit 52 is first initialized, or application 59 is first activated, processor 57 stores the current telephony identification value as current application ID 66. Current application ID 66 is indicative of the network through which local application 59 first communicates with its corresponding home application server. Then, as application 59 continues to operate, current telephony information is continually monitored or extracted from telephony functions 55. More particularly, current network identification information may be extracted and stored as current telephony ID 64 within memory 62. Local application 59 compares current application ID 66 to current telephony ID 64. As long as these identifications are the same, application 59 continues to operate through the same network. However, when current telephony ID 64 and current application ID 66 are different, then application 59 is aware that mobile subscriber unit 52 has moved to a new network. In this way, local application 59 may generate application alert 74. Application alert 74 may be communicated to the home application server, thereby updating the location information for mobile subscriber unit 52 at the home application server. Responsive to the update, the home application server is now able to efficiently communicate with mobile subscriber unit 52 without reinitializing application 59. Also, since the application server is aware of the network where mobile subscriber unit 52 is operating, the home application server may adjust the application according to predefined rules. For example, when mobile subscriber unit 52 moves to a new network, mobile subscriber unit 52 may have moved to an area not supported by the application. In this way, the application home server may send a message to application 59 to disable the local application 59, or notify the user that the application is no longer supported or operational. In another example, when mobile subscriber unit 52 moves to a new network, the home application server may apply a different billing structure. In another example, when mobile subscriber unit 52 moves to a new network, the home application server may send traffic, news, or other information relevant to that particular network's geographic location. This may also be useful for "presence" applications, such as instant messaging, where the home server desires to track the location of individual subscribers. In this way, the home server may accurately track and broadcast an indication of which uses are available for immediate communication. This also may be useful in the gaming environment, to enable a game server to communicate with gamers as game conditions change, or as gamer input is needed. As a final example, if the application is a push to talk application, then the push to talk home server is continually aware of the current location of mobile subscriber unit 52, and therefore may efficiently and accurately send messages to mobile unit 52 as needed.

Local application 59 may also include network instructions 69 that cooperate with compare function 72 in deciding when to send application alert 74, and what to include in alert 74. For example, network instructions 69 may include rules that generate application alert 74 only when the mobile subscriber unit 52 moves into a new service provider's network, or only send application alert 74 when mobile subscriber unit 52 moves into a network not on an approved list. It will be appreciated that alternative network instructions 69 may be provided.

Figure 3:
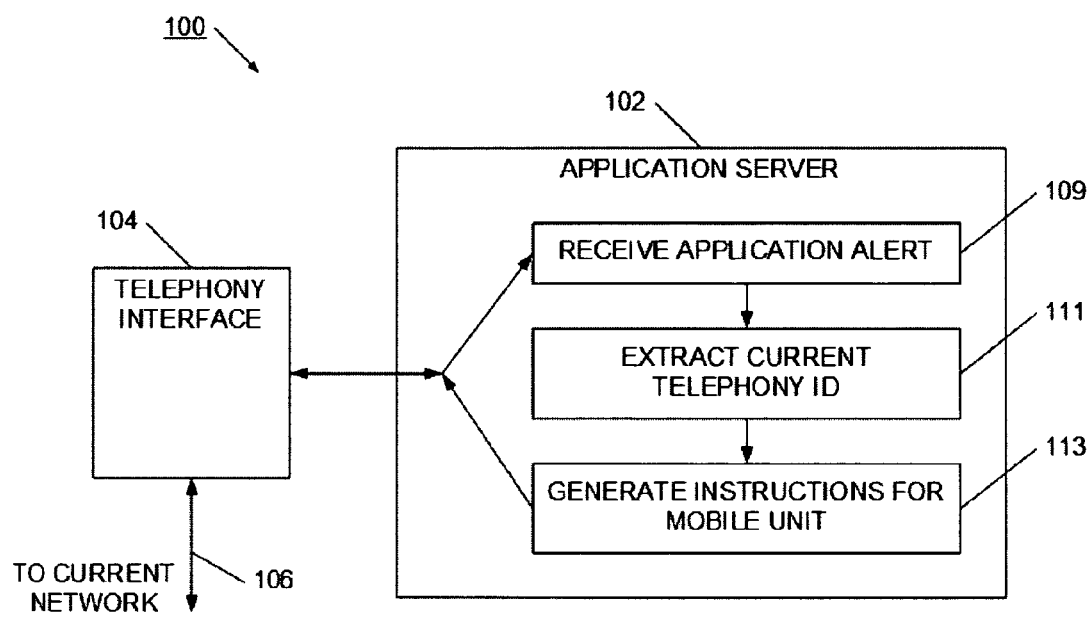
FIG. 3 is a block diagram of an application server in accordance with the present invention.

Referring now to FIG. 3, application server system 100 is illustrated. Application server system 100 includes home application server 102. Home application server 102 has telephony interface 104 for connecting to a wireless communication network. Often, telephony interface 104 is provided through a base station or a station controller operated by a communication service provider. The structure and process for providing a communication link from application server 102 to current network 106 is well understood, and will not be described in detail. It will also be understood that application server 102 may be provided as a single application server, or may include two or more distributed application servers. In this way, individual application servers may be provided at strategic communication points of the network, thereby reducing the overall network traffic. Application server 12 is configured to receive application alert 109 from a local application operating on a mobile subscriber unit. In one example, application alert 109 includes a network identification value indicating the network on which the mobile subscriber unit is currently operating. This current telephony identification is extracted from application alert 109 as shown in block 111. Responsive to this value, application server 102 may generate instructions for the mobile unit is shown in block 113. In one example, application server 102 is a push to talk home server. Mobile subscriber units associated with the push to talk feature each have local applications for implementing the push to talk feature. The local applications continually monitor the telephony identification values and communicate each change in the network ID values to the push to talk server. In this way, when the push to talk server needs to page or send other information to a particular mobile unit, the push to talk server is aware of the mobile subscriber units' current position.

Figure 4:
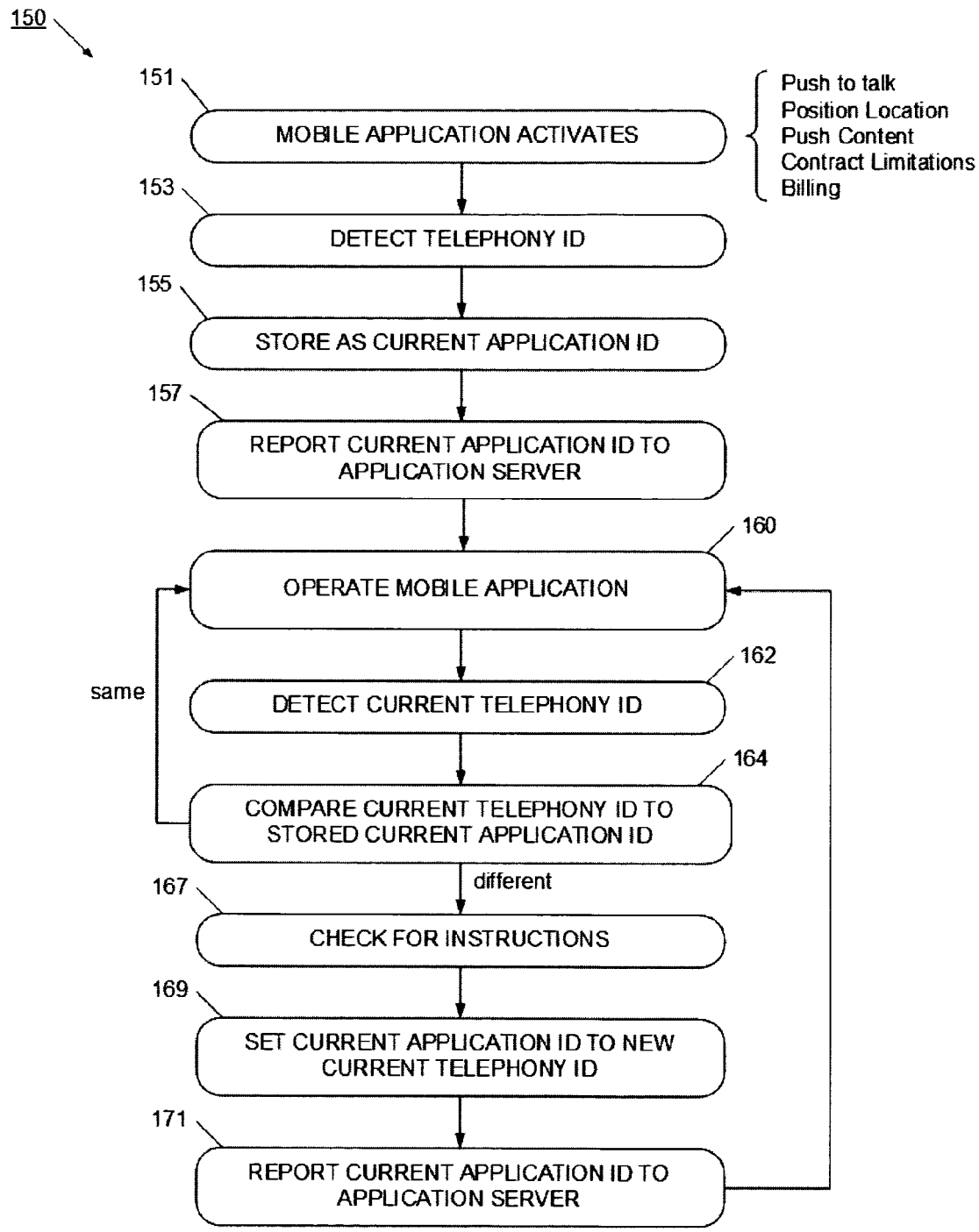
FIG. 4 is a flowchart of a method for updating a wireless application in accordance with the present invention.

Referring now to FIG. 4, a method for updating a wireless subscriber system is illustrated. Method 150 has a mobile application operating on a mobile wireless subscriber unit as shown in block 151. This mobile application may be, for example, a push to talk application, a position location application, a push content application, and may include provisions for enforcing contract limitations or billing agreements. As the mobile application operates, it detects a telephony ID value as shown in block 153. The telephony ID value is automatically updated within the wireless mobile device according to established communication standards. The telephony ID is set as the current application identification as shown in block 155. As the application activates, the application may report its current network information to its home application server as shown in block 157.

The mobile application continues to operate as shown in block 160. As the application operates, it continually detects or monitors the then current telephony ID, and may store the detected identification values as shown in block 162. The application compares the current telephony identification values to the stored current application identification values as shown in block 164. If those values are the same, then the application continues to operate the mobile application in the same network. However, if the values are different, then the application may send an alert to the home application server. In some cases, the application may check local instructions as shown in block 167. These local instructions may provide rules for when to generate an alert, or for what information to include in the alert. The local application also updates the application ID to the value of the current telephony ID as shown in block 169. The local application may generate an alert which reports the current application ID to the home application server as shown in block 171. In this way, the home application server becomes aware on which network each subscriber unit is currently operating. The application continues to operate on the mobile unit in the new network. Advantageously, the application home server has been notified of the change in network, and is able to efficiently control and interact with the local application.

Figure 5:
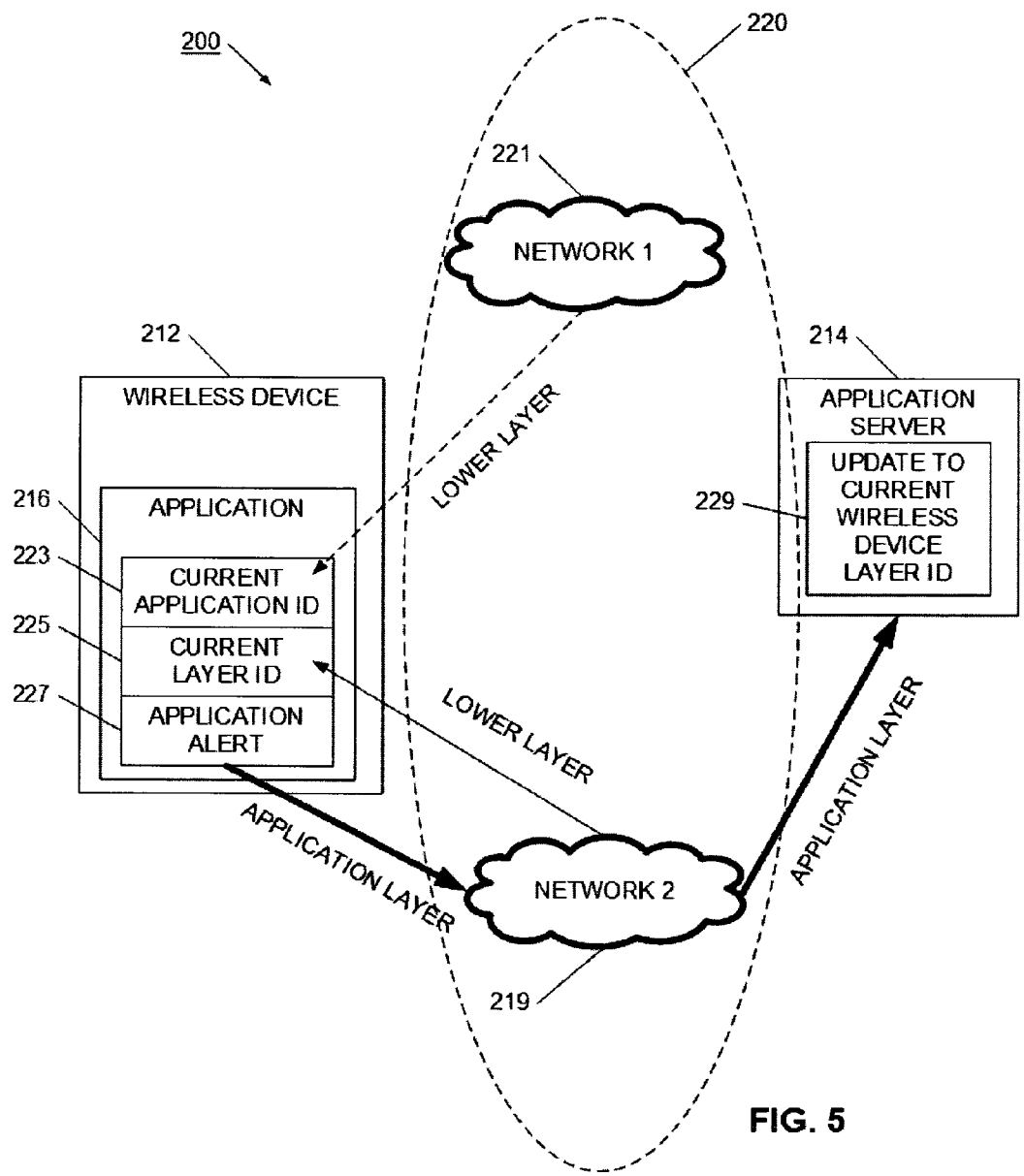
FIG. 5 is a block diagram of a system for updating a wireless application in accordance with the present invention.

Referring now to FIG. 5, system 200 for updating a wireless application is illustrated. Generally, an application has application server 214 which cooperates with local application 216 operating on a wireless access device 212. Together, application server 214 and local application 216 enable the application to bring enhanced functionality to wireless access device 212. For example, the application may enable wireless device 212 to operate over a mesh-network, while maintaining efficient communication and control of local applications 216 from application server 214. In another example, the application may push desirable information to wireless access device 212, dependent on device's 212 current location. More particularly, system 210 enables local application 216 to continually update application server 214 so that application server 214 knows on which network wireless access device 212 is currently operating. In this way, application server 214 may efficiently control and communicate with each wireless device, while avoiding the extra network traffic and delays associated with reinitializing the local application.

System 200 has network service area 220 which may be, for example, a wireless data network. This wireless data network may comply with one or more international standards, for example IEEE802.11, WiFi, Ethernet, or other evolving data communication standard. Although system 210 is described with reference to an 802.11 wireless communication network, it will be appreciated that other types of wireless networks may be used. Generally, network service area 220 includes several overlapping networks or access points, where each of these networks or access points provides network coverage for a particular area. For example, network service area 220 is illustrated having first network 221 and second network 219. It will be understood that the network service area may include several individual networks, which may be operated by the same or different service providers. Generally, network service area 220 includes a network infrastructure for interconnecting the various networks. This network infrastructure may include, for example, base stations, base station controllers, network backbone connections, and network servers. It will be appreciated that other components may be used to assist in interconnecting or operating the networks.

System 210 also includes wireless access devices, such as wireless device 212. It will be appreciated that many wireless access devices may operate within the network service area 220. For ease of explanation, only one wireless access device 212 will be described in detail. Wireless access device 212 may be for example, a wireless computer or a personal data assistant. In another example, wireless access device 212 is a modem access device built into another device, such as a car, truck, or other vehicle. Wireless access device 212 operates according to the same communication standard as operating within network 221 and network 219. As wireless access device 212 moves within network service area 220, or the network moves and reconfigures, wireless access device 212 connects first through one network, and then, will connect through another network. In some cases, the networks are operated by the same service provider, and in other cases the networks maybe operated by different service providers. Some wireless access device are constructed to operate in more than one mode or according to more than one communication standard. In this way, the mobile subscriber unit may operate in one mode or standard when connected through one network, and then may operate on a different mode or communication standard when moving into another network. As illustrated in FIG. 5, the wireless access device 212 is initialized and connects through first network 221, and then, as it moves or the network changes, wireless device 212 connects through second network 219.

In discussing network architectures and operations, it is often useful to discuss the network in terms of the Open System Interconnection (OSI) 7 layer model. The OSI, or Open System Interconnection, model defines a networking framework for implementing protocols in seven layers. Control is passed from one layer to the next, starting at the application layer in one station, proceeding to the bottom layer, over the channel to the next station and back up the hierarchy. The layers are generally defined below:

i. Application Layer (Layer 7). This layer supports application and end-user processes. Communication partners are identified, quality of service is identified, user authentication and privacy are considered, and any constraints on data syntax are identified. This layer is application-specific. This layer provides application services for file transfers, e-mail, and other network software services.

ii. Presentation Layer (Layer 6). This layer provides independence from differences in data representation (e.g., encryption) by translating from application to network format, and vice versa. The presentation layer works to transform data into the form that the application layer can accept. This layer formats and encrypts data to be sent across a network, providing freedom from compatibility problems. It is sometimes called the syntax layer.

iii. Session Layer (Layer 5). This layer establishes, manages and terminates connections between applications. The session layer sets up, coordinates, and terminates conversations, exchanges, and dialogues between the applications at each end. It deals with session and connection coordination.

iv. Transport Layer (Layer 4). This layer provides transparent transfer of data between end systems, or hosts, and is responsible for end-to-end error recovery and flow control. It ensures complete data transfer.

v. Network Layer (Layer 3). This layer provides switching and routing technologies, creating logical paths, known as virtual circuits, for transmitting data from node to node. Routing and forwarding are functions of this layer, as well as addressing, internetworking, error handling, congestion control and packet sequencing.

vi. Data Link Layer (Layer 2). At this layer, data packets are encoded and decoded into bits. It furnishes transmission protocol knowledge and management and handles errors in the physical layer, flow control and frame synchronization.

vii. Physical Layer (Layer 1). This layer provides the hardware means of sending and receiving data on a carrier, including defining cables, cards and physical aspects.

Communication standards generally are well defined for the lower-layers, but give less, and in some cases minimal, guidance on implementing the higher-layers. For convenience of discussion, the lower-layers are generally defined to be the layers 1 through 5, with the higher-layers defined to be layers 6 and 7. Of course, it will be appreciated that for some standards and implementations, the higher-layer and lower-layer definitions may be alternatively defined.

Wireless access device 212 may operate as a traditional data communication device, for example, on an IEEE802.11 network. In this way, wireless access device 212 operates using traditional lower-layer procedures consistent with the relevant communication standard. For example, if network 221 is an IEEE802.11 network, then the data communication between wireless access device 212 and network 221 is accomplished according to the detailed instructions provided in the IEEE802.11 standard. Over the years, the various wireless data communication standards have evolved to provide a fully operational and robust communication process at the OSI lower-layers. Wireless access device 212 may also operate one or more applications. These applications may be, for example, position location applications or information broadcast applications. In another example, the application may be a game, a mapping application, audio or video application, or sales support application. It will be appreciated that other applications may be used, and that new applications are continually being developed.

Often, the application has local application 216 operating on wireless access device 212, and which cooperates with application server 214. The application may require that local application 216 communicate with application server 214 to transmit information to or receive information from wireless access device 212. For example, local application 216 may be a news broadcast application. In this example, application server 214 is a news server, which sends selected news items to local application 216. Local application 216 then presents the received news information to the user of wireless access device 212. In order to facilitate efficient operation of the application, application server 214 desirably is aware of the current location for all the wireless access devices, such as wireless device 212. More particularly, it is desirable that application server 14 be aware through which network each mobile subscriber unit is currently operating.

System 200 is able to advantageously update application server 214 with current information regarding which network wireless access device 212 is currently using. In this way, application server 214 is enabled to efficiently communicate with and control the application and wireless access device 212. When mobile subscriber unit 212 initializes, or when the application 216 is first activated, a network identification is extracted from the OSI lower-layer communications and stored as current application ID 223. For example, wireless communication standards may require that the network broadcast certain network identification information during initialization or periodically during operation. The network identification information is well-defined in most wireless communication standards, and typically includes network identification values. These values are automatically received by wireless access device 212 upon initialization, and are updated periodically as wireless device 212 moves from one network to another network. More particularly, the network identification information is stored as current layer ID 225, and indicates the network on which wireless device 212 is currently operating. Local application 216 also extracts network identification information from one or more of the lower-layers, and stores the network identification value as current application ID 223. Then, as application 216 operates, application 216 continually monitors current layer ID 225 and compares current layer ID 225 to current application ID 223. In one example, current layer ID 225 is stored within application 216. As long as wireless access device 212 operates within a single network, such as network 221, current application ID 223 and current layer ID 225 are the same. However, when wireless access device 212 moves (or the network reconfigures) to operate within second network 219, then the lower-layer automatically updates the wireless access device 212 to indicate that wireless access device 212 is operating within network 219. Application 216, which is monitoring current lower-layer ID 225, now has a current application ID 223 showing network 221 identification information, while current lower-layer ID 225 shows the identification information for network 219. Since the network IDs are different, application 216 is aware that wireless access device 212 is now accessing through a different network. In this way, local application 216 may generate application alert 227. Application alert 227 may then be communicated through network 219 to application server 214. Application server 214 is then able to update its location information 229 to indicate that wireless access device 212 is now operating within network 219.

Application alert 227 may automatically generate responsive to detecting that the current network has changed. In another example, application alert 227 may apply local rules within application 216 for determining an appropriate application alert. For example, local application 216 may have rules that provide that application alert 227 may be generated when it detects a network operated by a different service provider. In another example, application 216 may have a local list of approved networks, and only generate application alert 227 when the current network is not listed. It will be appreciated that local application 216 may apply various rules as to when application alert 227 is generated. It will also be appreciated that application alert 227 may include various information. For example, application alert 227 may send current lower-layer ID 225 information, warnings and other information relevant to wireless device's 212 current network condition.

Figure 6:
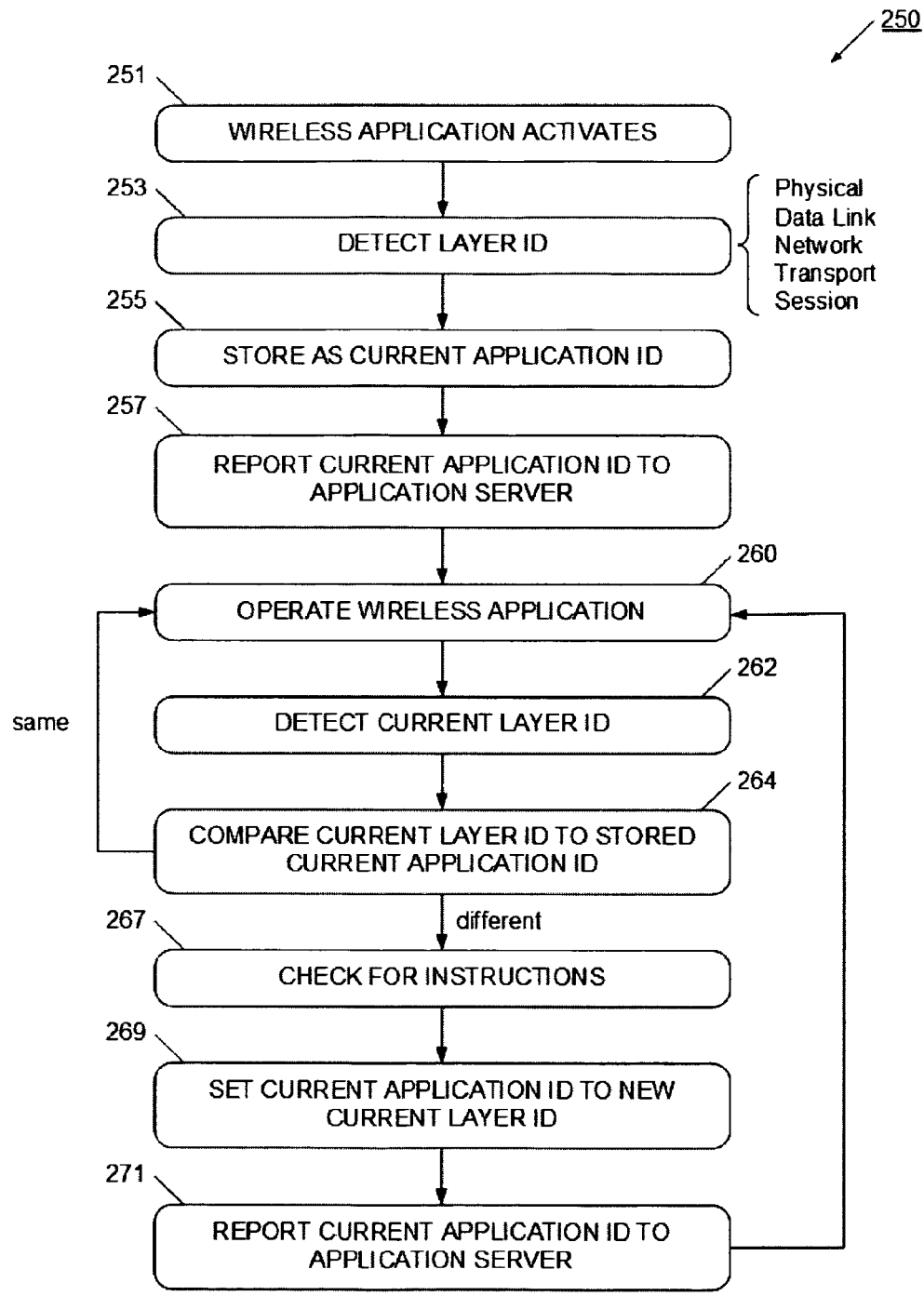
FIG. 6 is a flowchart of a method for updating a wireless application in accordance with the present invention.

Referring now to FIG. 6, a method 250 for updating a wireless data system is illustrated. Method 250 has a wireless data application operating on a wireless access device as shown in block 251. This wireless application may be, for example, a position location application, a push content application, and may include provisions for enforcing contract limitations or billing agreements. As the wireless application operates, it detects a lower-layer ID value as shown in block 253. The lower-layer ID value is automatically updated within the wireless data device according to established communication standards. The lower-layer ID is set as the current application identification as shown in block 255. As the application activates, the application may report its current network information to its home application server as shown in block 257.

The wireless application continues to operate as shown in block 260. As the application operates, it continually detects or monitors the then current lower-level ID, and may store the detected identification values as shown in block 262. The application compares the current lower-level identification values to the stored current application identification values as shown in block 264. If those values are the same, then the application continues to operate the wireless application in the same network. However, if the values are different, then the application may send an alert to the home application server. In some cases, the application may check local instructions as shown in block 267. These local instructions may provide rules for when to generate an alert, or for what information to include in the alert. The local application also updates the application ID to the value of the current lower-layer ID as shown in block 269. The local application may generate an alert which reports the current application ID to the home application server as shown in block 271. In this way, the home application server becomes aware on which network each subscriber unit is currently operating. The application continues to operate on the wireless unit in the new network. Advantageously, the application home server has been notified of the change in network, and is able to efficiently control and interact with the local application.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A system for updating a wireless subscriber application, comprising:
   a network service area having a plurality of networks;
   an application server coupled to at least one of the plurality of networks; and
   a mobile subscriber unit operating the steps comprising:
     connecting to a first network in the network service area using a first telephony level connection;
     storing a first identification indicative of the first telephony level connection;
     operating a local application in the first network, the local application transmitting and receiving information from the application server;
     connecting to a second network in the network service area using a second telephony level connection;
     storing a second identification indicative of the second telephony level connection;
     comparing the first identification to the second identification;
     generating an application alert responsive to the comparison when the first identification is different than the second identification; and
     transmitting the application alert to the application server.

2. The system according to claim 1, wherein the network service area is a wireless communication network, and the mobile subscriber unit is a wireless mobile handset.

3. The system according to claim 2, wherein the wireless communication network is a CDMA, WCDMA, CDMA2000, UTM, GSM, EDGE, or PHS communication network.

4. The system according to claim 1, wherein the first identification and the second identification are a SID, NID, Zone ID, MCC, or IMSI_11_12 value.

5. The system according to claim 1, wherein the local application is a push to talk application.

6. A mobile subscriber unit operating in a network service area, the mobile subscriber unit performing steps comprising:
   operating a local application, the local application configured to communicate with an application server;
   monitoring an identification value that is indicative of a telephony level connection;
   detecting that the telephony level connection has changed;
   generating an application alert responsive to the detecting step; and
   transmitting the application alert to the application server.

7. The mobile subscriber unit according to claim 6, wherein the identification is a SID, NID, or Zone ID value.

8. The mobile subscriber unit according to claim 6, wherein the identification is an MCC or IMSI_11_12 value.

9. The mobile subscriber unit according to claim 6, wherein the local application is a push to talk application.

10. The mobile subscriber unit according to claim 6, wherein the local application is a position location application.

11. The mobile subscriber unit according to claim 6, wherein the local application is a game communicating with a multi-player game hosted on the application server.

12. The mobile subscriber unit according to claim 6, wherein the local application is an instant messaging program.

13. The mobile subscriber unit according to claim 6, further comprising the steps of:
   storing a first identification value indicative of a first telephony level connection;
   storing a second identification value indicative of a second telephony level connection; and
   using the first and second identification values to detect that the telephony level connection has changed.

14. A push-to-talk mobile handset operating in a network service area, the mobile handset performing steps comprising:
   operating a push-to-talk application, the push-to-talk application configured to communicate with a push-to-talk server;
   monitoring an identification value that is indicative of a telephony level connection;
   detecting that the telephony level connection has changed;
   generating an alert responsive to the detecting step; and
   transmitting the alert to the push-to-talk server.

15. The mobile handset according to claim 14, wherein the identification is a SID, NID, or Zone ID value.

16. The mobile handset according to claim 14, wherein the identification is an MCC or IMSI_11_12 value.

17. The mobile handset according to claim 14, wherein the telephony level connection is a CDMA, CDMA2000, or WCDMA connection.

* * * * *